United States Patent
Chan

[19]

[11] Patent Number: 6,120,816
[45] Date of Patent: Sep. 19, 2000

[54] LOLLIPOP WITH PIVOT HOLDER

[76] Inventor: Pak Nin Chan, Unit A, Chuan Yuan Factory Building, 8/F, 342-344 Kwun Tong Road, Kwun Tong, Kowloon, The Hong Kong Special Administrative Region of the People's Republic of China

[21] Appl. No.: 09/257,328

[22] Filed: Feb. 25, 1999

[51] Int. Cl.[7] .................................................. A23G 3/00
[52] U.S. Cl. .......................... 426/104; 426/112; 426/134; 446/473; 446/487
[58] Field of Search ................................... 426/104, 112, 426/134; 446/144, 473, 487; 30/161, 159, 160

[56] References Cited

U.S. PATENT DOCUMENTS

| 5,503,857 | 4/1996 | Coleman et al. | 426/110 |
|---|---|---|---|
| 5,531,318 | 7/1996 | Coleman et al. | 206/738 |
| 5,615,941 | 4/1997 | Schecter | 362/109 |
| 5,647,129 | 7/1997 | Stamper | 30/139 |
| 5,681,200 | 10/1997 | Schecter | 446/76 |
| 5,702,742 | 12/1997 | Jones | 426/115 |
| 5,773,058 | 6/1998 | Jones | 426/106 |
| 5,781,998 | 7/1998 | Stamper | 30/139 |

FOREIGN PATENT DOCUMENTS 2324021 10/1998 United Kingdom ................... 426/104

*Primary Examiner*—Milton Cano
*Assistant Examiner*—Sherry A. Dauerman
*Attorney, Agent, or Firm*—Joan H. Pauly

[57] ABSTRACT

A confection device includes a body of confection, such as hard candy, pivotally mounted on a housing. The candy pivots between a position in which it is in a carrying space defined by the housing and a position in which it extends from an end of the housing ready for consumption in the manner of a conventional sucker. When the candy is in the carrying space, the open side of the housing is preferably closed by a cover to protect the candy against contamination.

22 Claims, 4 Drawing Sheets

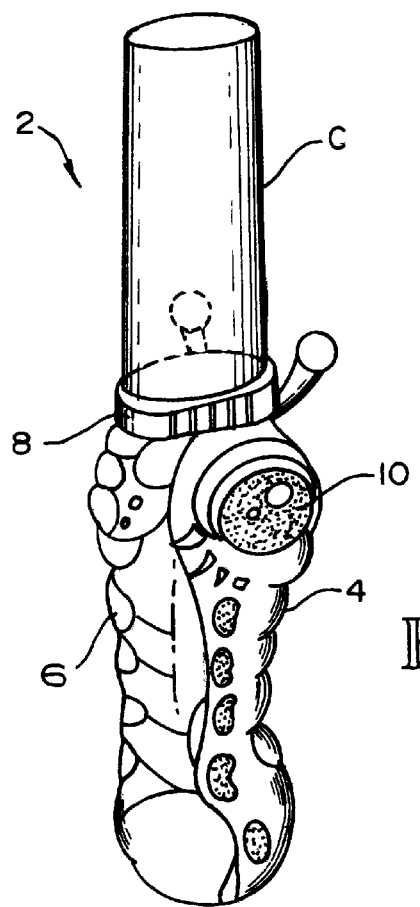
FIG. 1
FIG. 2

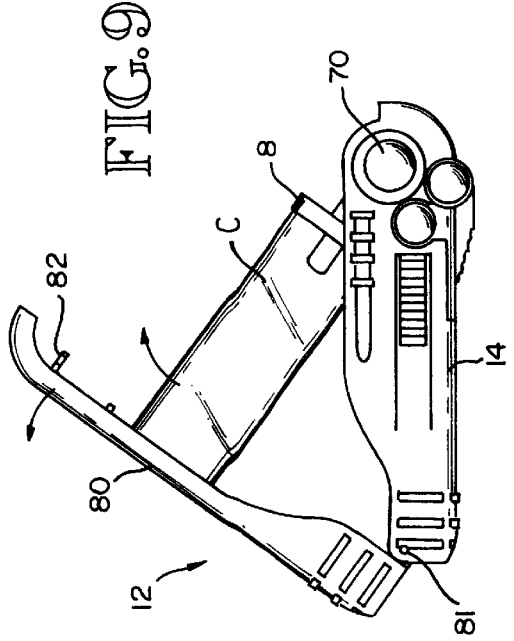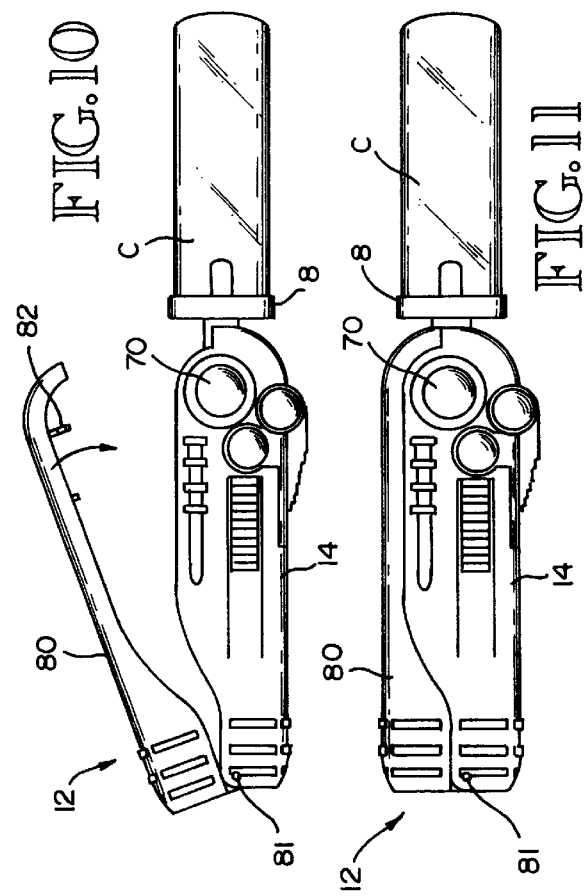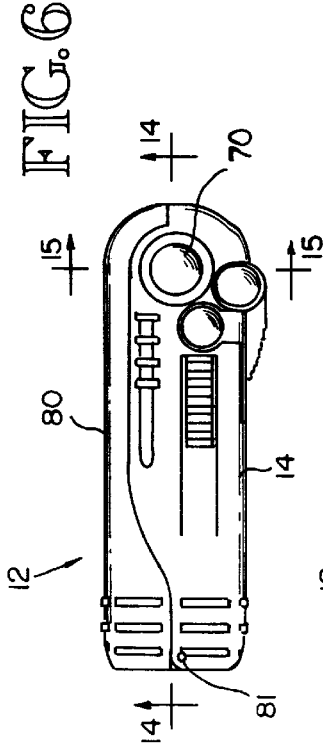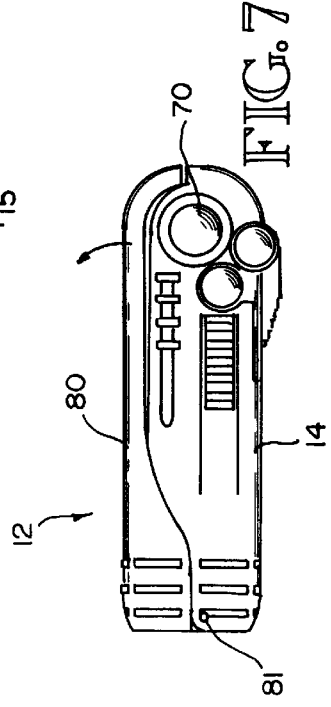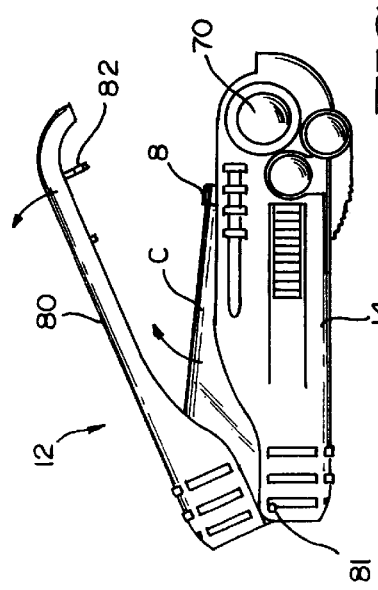

6,120,816

1

LOLLIPOP WITH PIVOT HOLDER

TECHNICAL FIELD

This invention relates to a novelty confection and, more particularly, to a confection that is pivotally mounted on a housing to pivot between a first position in which it is in a space defined by the housing and a second position in which it projects from the housing.

BACKGROUND OF THE INVENTION

Throughout history, people have enjoyed sweet edibles. Various types of candy and similar confections have been known for over a hundred years. The variety of such confections that are available has increased dramatically in this century. In recent years, confection products that have an interest in addition to their sweetness have become increasingly popular. There appears to always be a demand for more original products and particularly new products that appeal to children.

Lollipops are a type of candy that has been known for decades in its basic form of a ball of hard candy on a simple stick. Variations and elaborations of this basic theme are well-known. One type of variation is changing the nature of the candy on the stick. For example, specialty lollipops, such as lollipops with Santa Claus shaped candy, have been on the market for a number of years. One problem that is encountered in connection with traditional type suckers or lollipops, as well as some of the more recent modified types, is the tendency of children to put the sucker aside when the candy is only partially consumed. The sucker may be laid aside on a surface that is not clean. The child subsequently picks up the sucker and puts the candy in his mouth. This habit is unsanitary but is difficult for parents to avoid or control.

SUMMARY OF THE INVENTION

The present invention is directed toward a novelty confection. According to an aspect of the invention, the confection comprises a housing defining a carrying space, a mounting member, and a body of confection. The mounting member has opposite first and second ends. The first end is pivotally mounted on the housing adjacent to one end thereof, to pivot about an axis. The body of confection is secured to the second end of the mounting member and extends therefrom in a direction away from the first end and perpendicular to the axis. The mounting member has a first pivot position in which the confection body is in the space defined by the housing and a second pivot position in which the body projects from the housing. The mounting member is biased toward the second pivot position.

Preferably, the first and second pivot positions are about 180° apart. However, the amount of pivot between the first and second positions may be greater or less than this preferred amount.

A preferred feature of the invention is a cover for an open side of the housing through which the confection body pivots as the mounting member moves from its first pivot position to its second pivot position. The cover is pivotally attached to an end of the housing opposite the end adjacent to which the mounting member is pivotally mounted. The cover has a closed position in which it closes the open side of the housing. Preferably, the cover is positioned to be contacted, and pivoted away from its closed position, by the confection body when the mounting member pivots out of its first pivot position toward its second pivot position.

In the preferred embodiment, the novelty confection includes a latch and a release button. The latch is positioned

2 to engage the mounting member to inhibit pivotal movement of the mounting member out of its first pivot position toward its second pivot position. The release button is positioned on an outside surface of the housing and is operable to move the latch out of engagement with the mounting member. In its preferred form, the latch comprises a projection projecting into the housing parallel to the axis, and interlocking portions carried by the projection and the mounting member. The release button is attached to the projection and is biased outwardly with respect to the housing. This biases the interlocking portions into an engaged position in which they inhibit pivotal movement of the mounting member.

According to another aspect of the invention, the novelty confection comprises a housing defining a carrying space, a mounting member pivotally mounted as described above, and a body of confection secured to the mounting member as described above. The mounting member has a first pivot position in which the body is in the carrying space and a second pivot position in which the body projects from the housing. The novelty confection further comprises a latch and release button, as described above.

The novelty confection of the invention helps satisfy the desire of children for products that both provide a sweet edible and are interesting in a manner that goes beyond consumption of the edible. In addition, by providing a housing for the edible body of confection, the invention helps to avoid the problem of children putting confections down on unclean surfaces and later picking them up for further consumption. The protection against confections being put aside to pick up germs and dirt from unclean surfaces is maximized in embodiments of the invention including the preferred feature of the cover.

These and other advantages and features will become apparent from the detailed description of the best modes for carrying out the invention that follows.

BRIEF DESCRIPTION OF THE DRAWINGS

In the drawings, like element designations refer to like parts throughout, and:

FIG. 1 is a pictorial view of a child holding a novelty confection constructed in accordance with the invention in a position preparatory to beginning consumption of the edible confection portion.

FIG. 2 is a pictorial view of a first preferred embodiment of the invention, showing the confection in a projecting position ready for consumption.

FIGS. 6–11 are side elevational views illustrating movement of the edible confection out of the position shown in FIG. 3 and into the position shown in FIG. 5.

BEST MODES FOR CARRYING OUT THE INVENTION

Figure 3:
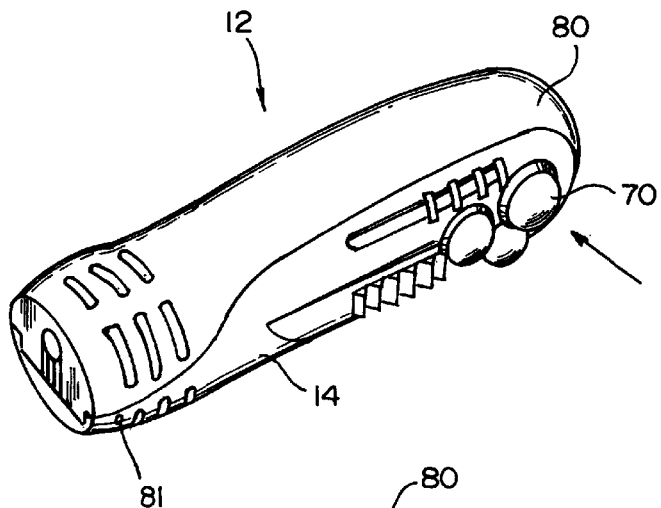
FIG. 3 is a pictorial view of a second preferred embodiment of the invention in a closed configuration in which the edible confection is inside the housing.

The drawings show two novelty confections 2, 12 that are constructed according to the invention and that constitute the best modes for carrying out the invention currently known to the applicant. The two embodiments differ with respect to the ornamental configurations of the exterior surfaces of the housing and cover. In other respects, the two embodiments are essentially identical.

Referring to FIGS. 1 and 2, the first embodiment 2 comprises a housing 4 having a cover 6. A mounting member 8 is pivotally mounted on the housing 4. An elongated body C of confection, such as a body of hard candy, is secured to the end of the mounting member 8 visible in FIG. 2. The candy C is shown in FIG. 2 projecting from the elongated housing 4 from one end thereof along the longitudinal axis thereof. A release button 10 is mounted on the outside surface of the housing 4 for the purpose described below in connection with the second embodiment 12 shown in FIGS. 3–16. As can be seen in FIG. 2, the exterior configuration of the first embodiment housing 4 and cover 6 represents a worm, with the release button 10 appearing as an enlarged eye. The functioning of the embodiment of FIG. 2 is the same as that of the embodiment of FIGS. 3–16, described below.

Figure 13:
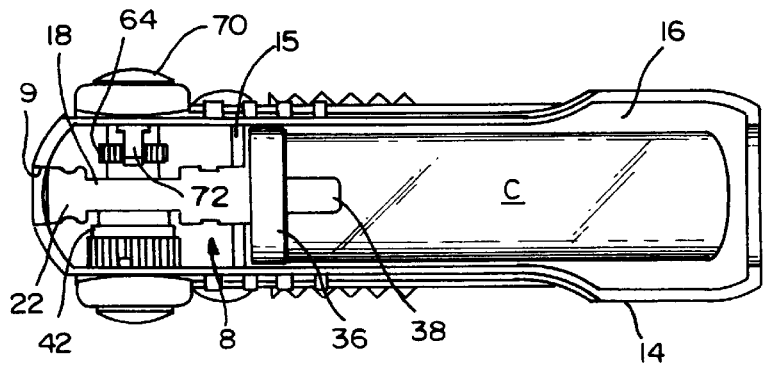
FIG. 13 is a plan view of the embodiment shown in FIGS. 3–12, with the cover omitted.

Referring to FIG. 3, the second embodiment 12 includes a housing 14 with a cover 80. The outer surfaces of the housing 14 and cover 80 are configured to resemble a pocket knife. The housing 14 defines an inner carrying space 16, shown in FIGS. 4 and 13. A divider wall 15, visible in FIG. 13, projects into the space 16. The wall 15 has a notch 17 on its inner free end for receiving the mounting member 8 when the candy body C is in position inside the housing 14, as shown in FIG. 13. The end of the housing 14 through which the mounting member 8 projects when the candy C is in its projecting position shown in FIG. 5 has a corresponding notch 9 for receiving the mounting member 8.

Figure 14:
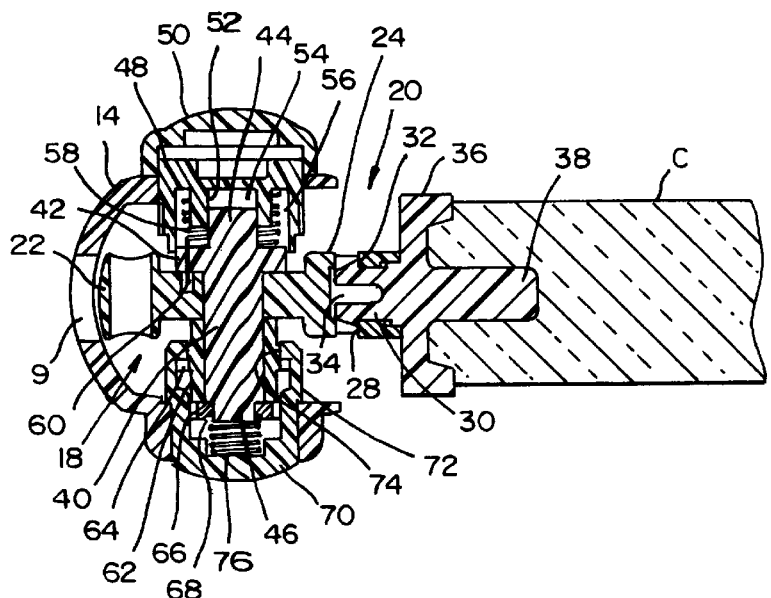
FIG. 14 is a partial sectional view taken along the line 14—14 of FIG. 6 with portions of the housing omitted and the end of the body of confection cut away.

The structure of the mounting member 8 is best seen in FIGS. 13 and 14. The mounting member 8 has a first end 18 that is pivotally mounted on the housing 14 adjacent to the end in which the notch 9 is formed. The mounting member 8 is mounted to pivot about an axis X, shown in FIG. 12. The opposite second end 20 of the mounting member 8 has secured thereto the candy body C. The candy C extends from the second end 20 in a direction away from the first end 18 and perpendicular to the axis X. The mounting member 8 is mounted to pivot between a first pivot position, shown in FIGS. 3, 6, and 13, and a second pivot position, shown in FIGS. 5 and 11. When the mounting member is in the first pivot position, the candy C is in the space 16. When the mounting member is in the second pivot position, the candy C projects from the housing 14.

Figure 12:
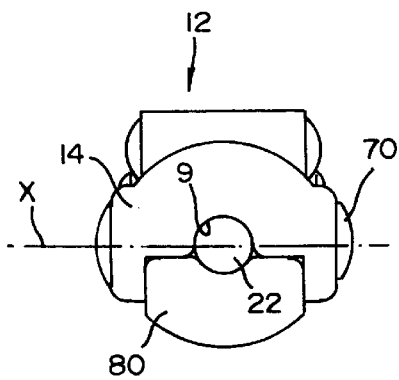
FIG. 12 is an end view of the embodiment shown in FIGS. 3–11.

The first end 18 of the mounting member 8 has an extension 22 that helps guide pivotal movement of the mounting member 8. The extension 22 also cooperates with the divider wall 15 to help stabilize the position of the mounting member 8 when the mounting member 8 is in its second pivot position. In addition, the extension 22 substantially closes the notch opening 9 when the mounting member 8 is in its first pivot position. This closing of the notch opening 9 is illustrated in FIGS. 12–14 and helps maximize the protection of the candy C against contamination when the housing 14 is put aside or in a pocket before the candy C has been completely consumed.

Still referring to FIGS. 13 and 14, the second end 20 of the mounting member 8 to which the candy C is attached includes a main portion 24. The main portion 24 has a socket formed therein and opposite shoulders 28 facing inwardly at a mid portion of the socket. The end 20 is formed in two pieces in order to facilitate manufacture. The second piece has a short attaching end 30 that is received into the socket formed by the main portion 24. Shoulders 32 are formed on the end 30 and abut the shoulders 28 on the main portion 24, as shown in FIG. 14, to secure the two pieces together. The end 30 has a cutout 34 to allow it to be compressed for insertion into the socket. The second piece also includes a base 36 from which a projection 38 extends in a direction opposite the short end 30. The base 36 and projection 38 cooperate to securely mount the candy C to the mounting member 8.

Figure 15:
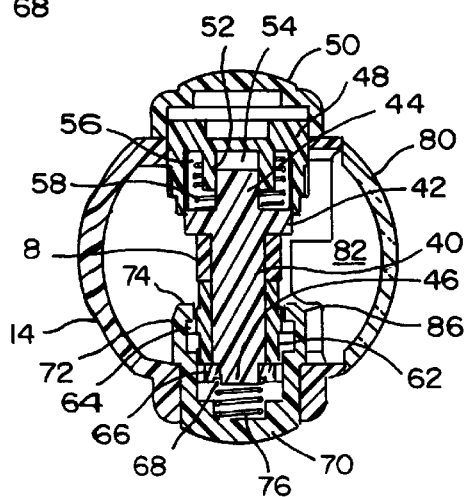
FIG. 15 is a cross-sectional view taken along the line 15—15 in FIG. 6.
Figure 16:
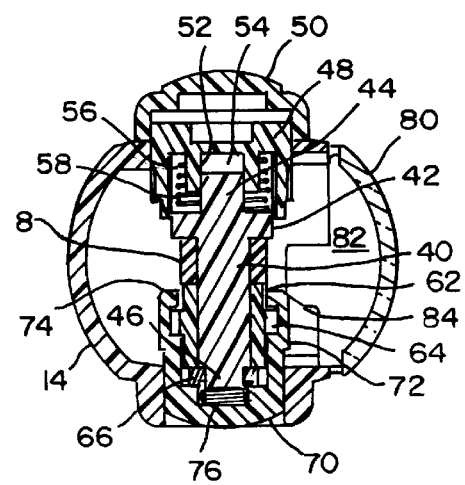
FIG. 16 is like FIG. 15 except that it shows the cover and release button in the positions shown in FIG. 7.

The mounting member 8 is mounted on the housing 14 by means of a pivot shaft 40. The shaft 40 can be seen in FIGS. 13–16 and is best seen in FIGS. 14–16. The shaft 40 has a radial flange 42 formed thereon and a first end portion 44 projecting axially beyond the flange 42. A reduced diameter end portion 46 is formed on the opposite end of the shaft 40.

Figure 5:
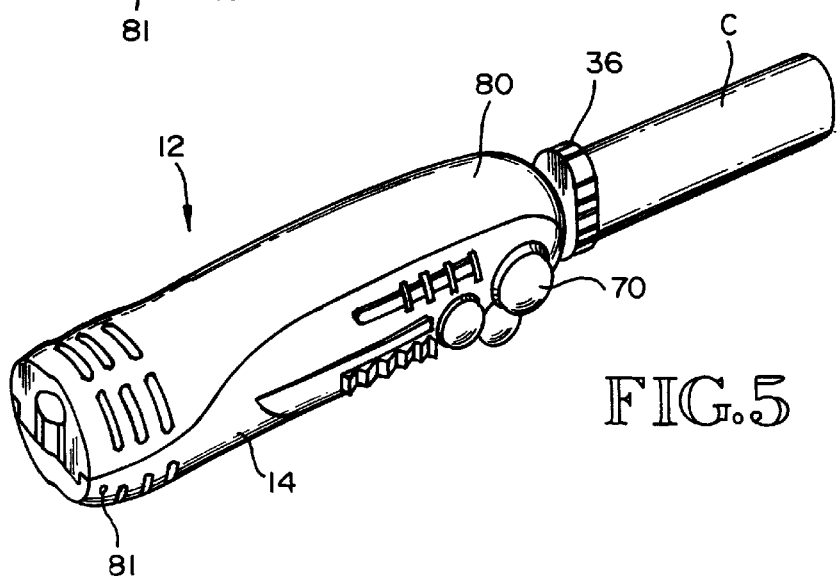
FIG. 5 is like FIG. 4 except that it shows the edible portion fully extended out of the housing and the cover back in its closed position.

The mounting member 8 is biased toward its second pivot position shown in FIGS. 5 and 11. A spring mounting member 48 is carried by the housing 14 adjacent to the first end portion 44 of the shaft 40. The member 48 is in turn secured in a recess formed in a knob portion 50 of the housing 14. The member 48 is interference fit into the recess to prevent movement of the member 48 relative to the housing 14. The member 48 has an inner annular wall 52 which divides a recess formed by the member 48 into a center recess 54 and an outer annular spring recess 56. A coil spring 58 is positioned in the annular recess 56 and has a first end that abuts and is anchored to the inner end of the recess 56. The opposite end of the spring 58 extends outwardly from the recess 56 through the pivot shaft flange 42 and into a recess 60 in the first end 18 of the mounting member 8, as shown in FIG. 14. Movement of the mounting member 8 into its first pivot position compresses the spring 58.

The pivot shaft 40 extends through a suitable opening in the center of the mounting member 8. Opposite circumferential surfaces of the mounting member 8 abut the flange 42 and a sleeve 62 that surrounds the shaft 40 adjacent to the reduced diameter end portion 46. The sleeve 62 has a gear 64 formed thereon. As described further below, the gear 64 forms a part of a latch mechanism. A spring end member 66 surrounds the reduced diameter end portion 46 of the shaft 40 and abuts the outer end of the sleeve 62. The outer end of the end member 66 has a spring abutment recess 68 formed therein.

The novelty confection device 12 also includes a release button 70 which corresponds to the release button 10 shown in FIG. 2. The release button 70 is positioned on an outside surface of the housing 14, as shown in FIGS. 3–16. A projection 72 extends from the button 70 inwardly into the space 16 defined by the housing 14. The inner end of the projection 72 has teeth 74 formed thereon. The projection 72 extends parallel to the axis X, and the teeth 74 formed thereon provide interlocking portions that interlock with the teeth of the gear 64 carried by the sleeve 62. The projection 72 may include two opposite separate projecting legs, one of which is visible in FIG. 13.

Since the mounting member 8, shaft 40, and sleeve 62 all pivot as a unit, the interengagement of the teeth 74 and gear 64 is, in effect, an interengagement between the release button projection 72 and the mounting member 8. The interengagement inhibits pivotal movement of the mounting member 8. A spring 76 is positioned in the inner end of the recess defined by the projection 72 and abuts the inner end of the recess and an inner surface of the abutment recess 68 in the spring end member 66. This biases the release button 70 into the projecting position shown in FIGS. 14 and 15 to in turn bias the teeth 74 and gear 64 into an interengaged position. The button 70 may be moved inwardly by pressing a thumb or finger against it to move the teeth 74 out of engagement with the gear 64. This action allows pivotal movement of the mounting member 8.

As mentioned above, the device of the invention also includes a cover 80. The cover 80 is pivotally mounted to the end of the housing 14 opposite the pivot shaft 40. The pivot location is indicated by the reference numeral 81 in FIGS. 3–11. Adjacent to its outer free end, the cover 80 has a projection 82 formed thereon that extends into the space 16 when the cover 80 is in its closed position. Referring to FIGS. 15 and 16, when the release button 70 is pushed into its inner release position, a cam surface 86 on the end of the button's projection 72 contacts a bevel 84 on the projection 82 of the cover 80.

The operation of the invention is illustrated in FIGS. 3–5 and 6–11. FIGS. 3 and 6 show the novelty confection device in its closed storage configuration. The mounting member 8 is in its first pivot position with the candy body C in the space 16 defined by the housing 14. The cover 80 is in its closed position in which it closes the open side of the housing 14. To move the candy C out of the housing 14 into a position for consumption, the user holds the housing 14 in one hand with the cover 80 facing upwardly and the housing end with the release button 70 thereon facing outwardly. The release button 70 is pressed inwardly with the thumb. This causes the cam surface 86 on the button projection 72 to contact the bevel 84 on the cover inner projection 82, as shown in FIG. 16. The contact between the surfaces 84, 86 causes the cover to open slightly, as illustrated in FIGS. 7 and 16.

Figure 4:
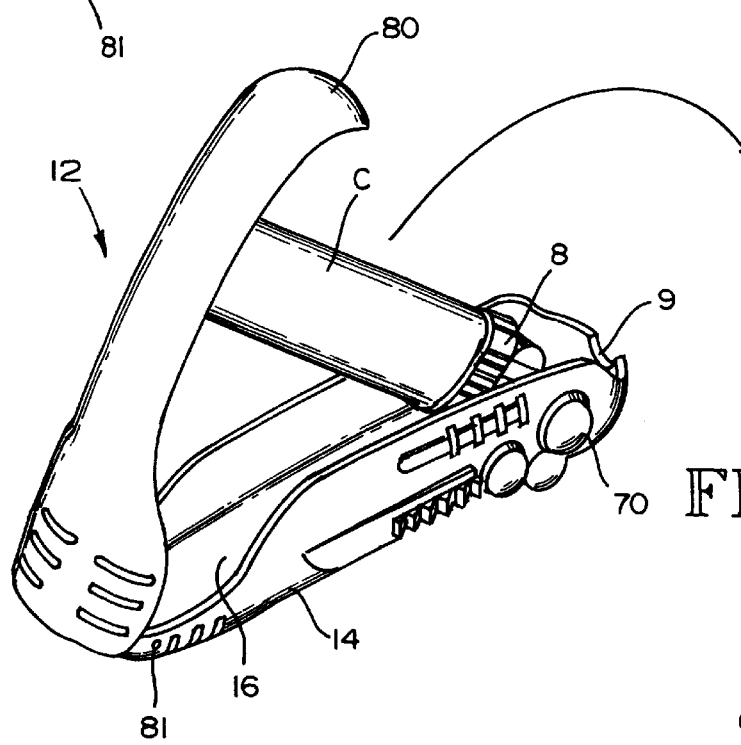
FIG. 4 is like FIG. 3 except that it shows the edible portion moving out of the housing.

Movement of the button projection 72 also releases the interengagement between the teeth 74 and the gear 64 to allow the spring 58 to pivot the mounting member 8 outwardly through the open side of the housing 14 toward its second pivot position. FIG. 8 illustrates the beginning of this pivoting movement. As can be seen in FIG. 8, the free end of the candy body C contacts the cover 80 to pivot the cover 80 away from its closed position and toward an open position. FIGS. 4 and 9 illustrate the configuration as the outward pivoting motion of the mounting member 8 and candy C continues. Once the candy C clears the cover 80 and moves into the projecting consumption position shown in FIGS. 5, 10, and 11, the cover 80 is returned by gravity into its closed position in which it closes the open side of the housing 14. FIG. 10 illustrates the cover 80 moving back into its closed position. FIGS. 5 and 11 show the configuration when the cover 80 has returned to its closed position and the candy C extends from the end of the housing 14 ready to be consumed.

When it is desired to put the novelty confection 12 aside after having deployed the candy C into the position shown in FIGS. 5 and 11, it is a simple matter to return the candy C to its stored position shown in FIGS. 3 and 6. The cover 80 is easily opened by moving it manually into a position slightly beyond that shown in FIGS. 4 and 9. In this fully open position, the cover extends essentially perpendicularly to the housing 14. Then, the candy C is returned to the carrying space 16 by pushing on the mounting member base 36 to pivot the mounting member 8 and candy C 180° into the first pivot position. Preferably, the interengagement of the teeth 74 and gear 64 is sufficiently resilient to yield when a manual force is exerted on the base 36 to return the mounting member 8 to its first pivot position. Movement of the member 8 into the first position compresses the spring 58 preparatory to the next time it is desired to deploy the candy C. When the manual force is removed from the mounting member 8, the spring 76 that biases the release button 70 into its outer position holds the button 70 in the outer position to maintain interengagement between the gear 64 and teeth 74. This interengagement holds the mounting member 8 in its first pivot position and the candy C in the space 16. Then, the cover 80 may be closed by simply giving it a little push or allowing gravity to cause it to return to its closed position.

The various parts of the novelty confection device may be made from various materials. As noted above, the confection body C is preferably formed from hard candy. However, other types of candy or other confections may also be used. The nonedible portions, including the housing 14, cover 80, mounting member 8, and pivot shaft assembly, are preferably formed from molded plastic. The only exception is that the springs 58, 76 would typically be metal. Certain portions of the device, including the mounting member 8, are made from two or more separate pieces rather than a single piece for reasons relating to ease and cost effectiveness of manufacture, as opposed to function. The details of the configurations of the various parts and the choice to form them from a single or a plurality of portions may be varied without departing from the spirit and scope of the invention.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. A confection comprising:
   a housing defining a carrying space;
   a mounting member having opposite first and second ends, said first end being pivotally mounted on said housing adjacent to one end thereof, to pivot about an axis; and
   a body of confection secured to said second end and extending therefrom in a direction away from said first end and perpendicular to said axis;
   said mounting member having a first pivot position in which said body is in said space and a second pivot position in which said body projects from said housing, and said mounting member being biased toward said second pivot position.

2. The confection of claim 1, wherein said first and second pivot positions are about 180° apart.

3. The confection of claim 1, in which said housing has an open side through which said body pivots as said mounting member moves from its first pivot position to its second pivot position; and which comprises a cover pivotally attached to an end of said housing opposite said one end of said housing, said cover having a closed position in which it closes said open side.

4. The confection of claim 3, in which said cover is positioned to be contacted, and pivoted away from its closed position, by said body when said mounting member pivots out of its first pivot position toward its second pivot position.

5. The confection of claim 4, wherein said first and second pivot positions are about 180° apart.

6. The confection of claim 5, further comprising a latch positioned to engage said mounting member to inhibit pivotal movement of said mounting member out of said first pivot position toward said second pivot position; and a release button positioned on an outside surface of said housing and operable to move said latch out of engagement with said mounting member.

7. The confection of claim 1, further comprising a latch positioned to engage said mounting member to inhibit pivotal movement of said mounting member out of said first pivot position toward said second pivot position; and a release button positioned on an outside surface of said housing and operable to move said latch out of engagement with said mounting member.

8. The confection of claim 7, wherein said latch comprises a projection projecting into said housing parallel to said axis, and interlocking portions carried by said projection and said mounting member; and said release button is attached to said projection and is biased outwardly with respect to the housing to bias said interlocking portions into an engaged position in which they inhibit pivotal movement of said mounting member.

9. The confection of claim 7, in which said housing has an open side through which said body pivots as said mounting member moves from its first pivot position to its second pivot position; and which comprises a cover pivotally attached to an end of said housing opposite said one end of said housing, said cover having a closed position in which it closes said open side.

10. The confection of claim 9, wherein said latch comprises a projection projecting into said housing parallel to said axis, and interlocking portions carried by said projection and said mounting member; and said release button is attached to said projection and is biased outwardly with respect to the housing to bias said interlocking portions into an engaged position in which they inhibit pivotal movement of said mounting member.

11. The confection of claim 3, wherein said first and second pivot positions are about 180° apart.

12. The confection of claim 11, further comprising a latch positioned to engage said mounting member to inhibit pivotal movement of said mounting member out of said first pivot position toward said second pivot position; and a release button positioned on an outside surface of said housing and operable to move said latch out of engagement with said mounting member.

13. The confection of claim 12, wherein said latch comprises a projection projecting into said housing parallel to said axis, and interlocking portions carried by said projection and said mounting member; and said release button is attached to said projection and is biased outwardly with respect to the housing to bias said interlocking portions into an engaged position in which they inhibit pivotal movement of said mounting member.

14. A confection comprising:

a housing defining a carrying space;

a mounting member having opposite first and second ends, said first end being pivotally mounted on said housing adjacent to one end thereof, to pivot about an axis; and a body of confection secured to said second end and extending therefrom in a direction away from said first end and perpendicular to said axis;

said mounting member having a first pivot position in which said body is in said space and a second pivot position in which said body projects from said housing;

a latch positioned to engage said mounting member to inhibit pivotal movement of said mounting member out of said first pivot position toward said second pivot position; and a release button positioned on an outside surface of said housing and operable to move said latch out of engagement with said mounting member.

15. The confection of claim 14, wherein said first and second pivot positions are about 180° apart.

16. The confection of claim 14, in which said housing has an open side through which said body pivots as said mounting member moves from its first pivot position to its second pivot position; and which comprises a cover pivotally attached to an end of said housing opposite said one end of said housing, said cover having a closed position in which it closes said open side.

17. The confection of claim 16, wherein said latch comprises a projection projecting into said housing parallel to said axis, and interlocking portions carried by said projection and said mounting member; and said release button is attached to said projection and is biased outwardly with respect to the housing to bias said interlocking portions into an engaged position in which they inhibit pivotal movement of said mounting member.

18. The confection of claim 16, wherein said first and second pivot positions are about 180° apart.

19. The confection of claim 18, wherein said latch comprises a projection projecting into said housing parallel to said axis, and interlocking portions carried by said projection and said mounting member; and said release button is attached to said projection and is biased outwardly with respect to the housing to bias said interlocking portions into an engaged position in which they inhibit pivotal movement of said mounting member.

20. The confection of claim 16, in which said cover is positioned to be contacted, and pivoted away from its closed position, by said body when said mounting member pivots out of its first pivot position toward its second pivot position.

21. The confection of claim 20, wherein said first and second pivot positions are about 180° apart.

22. The confection of claim 14, wherein said latch comprises a projection projecting into said housing parallel to said axis, and interlocking portions carried by said projection and said mounting member; and said release button is attached to said projection and is biased outwardly with respect to the housing to bias said interlocking portions into an engaged position in which they inhibit pivotal movement of said mounting member.

\* \* \* \* \*